United States Patent
Caddell

(10) Patent No.: US 7,336,043 B2
(45) Date of Patent: Feb. 26, 2008

(54) TRANSISTOR MATRIX SWITCHED RELUCTANCE VARIABLE SPEED MOTOR DRIVE

(75) Inventor: Richard W. Caddell, Otis, IN (US)

(73) Assignee: Sullair Corporation, Michigan City, IN (US)

( * ) Notice: Subject to any disclaimer, the term of this patent is extended or adjusted under 35 U.S.C. 154(b) by 208 days.

(21) Appl. No.: 11/035,118

(22) Filed: Jan. 13, 2005

(65) Prior Publication Data

US 2006/0152091 A1 Jul. 13, 2006

(51) Int. Cl.
*H02K 41/00* (2006.01)
*H02P 1/00* (2006.01)
*H02P 3/00* (2006.01)
*H02P 5/00* (2006.01)
*H02P 7/00* (2006.01)

(52) U.S. Cl. ...................................... 318/135
(58) Field of Classification Search ............... None
See application file for complete search history.

(56) References Cited

U.S. PATENT DOCUMENTS

| | | | |
|---|---|---|---|
| 2,222,823 A | 11/1940 | Parenti | |
| 2,578,902 A | 12/1951 | Smith | |
| 2,721,024 A | 10/1955 | Zeh | |
| 3,176,241 A | 3/1965 | Hogan | |
| 3,492,819 A | 2/1970 | Waltrip | |
| 3,740,171 A | 6/1973 | Farkos | |
| 4,162,876 A | 7/1979 | Kolfertz | |
| 4,221,548 A | 9/1980 | Child | |
| 4,567,391 A | 1/1986 | Tucker | |
| 5,490,056 A * | 2/1996 | Iwasaki | ........................ 363/97 |
| 5,734,209 A | 3/1998 | Hallidy et al. | |
| 6,429,562 B2 * | 8/2002 | Nakano et al. | ............. 310/113 |
| 6,472,845 B2 * | 10/2002 | Minagawa et al. | ......... 318/801 |
| 6,765,321 B2 | 7/2004 | Sakamoto | |

FOREIGN PATENT DOCUMENTS

GB 1 502 676 4/1975
JP 2004222383 8/2004

OTHER PUBLICATIONS

International Search Report, dated Apr. 13, 2006.
International Search Report, International Application No. PCT/US2006/000537, International Filing Date Jan. 9, 2006.
Written Opinion of the International Searching Authority, International Application No. PCT/US2006/000537, International Filing Date Jan. 9, 2006.

* cited by examiner

*Primary Examiner*—Lincoln Donovan
*Assistant Examiner*—Erick Glass
(74) *Attorney, Agent, or Firm*—Carlson, Gaskey & Olds

(57) ABSTRACT

A multi-phase motor drive includes coil magnets that generate a magnetic field when energized with an electrical current. The coil magnets are configured in an electrical matrix. Switches are arranged in an electrical circuit with the coil magnets. Each coil magnet is in electrical communication with at least two of the switches and each switch is in electrical communication with more than one coil magnet. The switches operate in pairs to energize the coil magnets and the multi-phase motor drive includes a lesser number of switch pairs than coil magnets.

2 Claims, 2 Drawing Sheets

TRANSISTOR MATRIX SWITCHED RELUCTANCE VARIABLE SPEED MOTOR DRIVE

BACKGROUND OF THE INVENTION

This invention relates to multi-phased motor drives and, more particularly, to a multi-phase motor drive including coil magnets and transistors arranged in an electric circuit matrix.

Electric multi-phase motors are widely used in such applications as pumps and compressors. A typical multi-phase motor drives a rotor or multiple rotors in response to magnetic fields selectively generated by coil magnets. Each coil magnet is in electrical communication with a motor drive, which selectively energizes the coil magnets to produce the magnetic fields that drive the rotors. The rotors drive a fluid, such as air or hydraulic fluid, from an intake to a discharge.

Disadvantageously, the full force of the magnetic flux generated by the coil magnets act on the rotors when the coil magnets are energized using these conventional motor drives. This causes a jerking type rotor movement, which may reduce efficiency. This is most evident at relatively low rotor speeds. For example, if each coil magnet of a nine coil magnet multi-phase motor is turned on for one second, one cycle of the rotor would then take nine seconds. The time for the rotor to move between magnets may only take one tenth of a second. For the other nine tenths of a second, the rotor would be stopped. This type of motor drive control is relatively inefficient as the rotor loses inertial energy during starts and stops.

Typical motor drives are configured such that each coil magnet is connected between two transistor switches. In one example having three coil magnets, each of the coil magnets is electrically connected between a low side transistor and a high side transistor. The low side transistors are connected to the negative DC bus ground and the high side transistors are connected to the positive DC bus. To energize a selected coil magnet, the associated low side and high side transistors are turned on to open an electrical connection. Other conventional examples that include additional coil magnets require additional high and low side transistors for each additional coil magnet. Utilizing two transistors for each coil magnet proportionately increases the expense of the multi-phase motor drive system.

Accordingly, a motor drive system that utilizes less than a pair of transistors for each coil magnet while more efficiently controlling movement of the rotor(s) is needed.

SUMMARY OF THE INVENTION

A multi-phase motor drive according to the present invention includes a plurality of coil magnets that generate a magnetic field when energized with an electric current and a plurality of switches that are arranged in an electric circuit with the plurality of coil magnets. The plurality of switches are in electrical communication with the plurality of coil magnets and each coil magnet is in electrical communication with at least two of the plurality of switches. Each switch is in electrical communication with more than one of the plurality of coil magnets.

A controller controls a speed and force of the rotor by pulsing the on/off duty cycle of the coil magnets. By pulsing the magnetic field, the attraction on the rotor may be controlled to control the speed and force of the rotor. The force that the rotor exerts on the fluid in the tubular rotor guide increases as the length of magnetic field pulses increases. Longer "on" pulses create greater attraction and more force. The controller also delivers more magnetic field force when the rotor is farther away from the coil magnetic. These features of controlling the rotor provide the benefits of increased operational efficiency compared to previously known multi-phase motors and motor drives.

The present invention therefore provides a motor drive system that utilizes less than a pair of transistors for each coil magnet to more efficiently controll movement of the rotor(s).

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
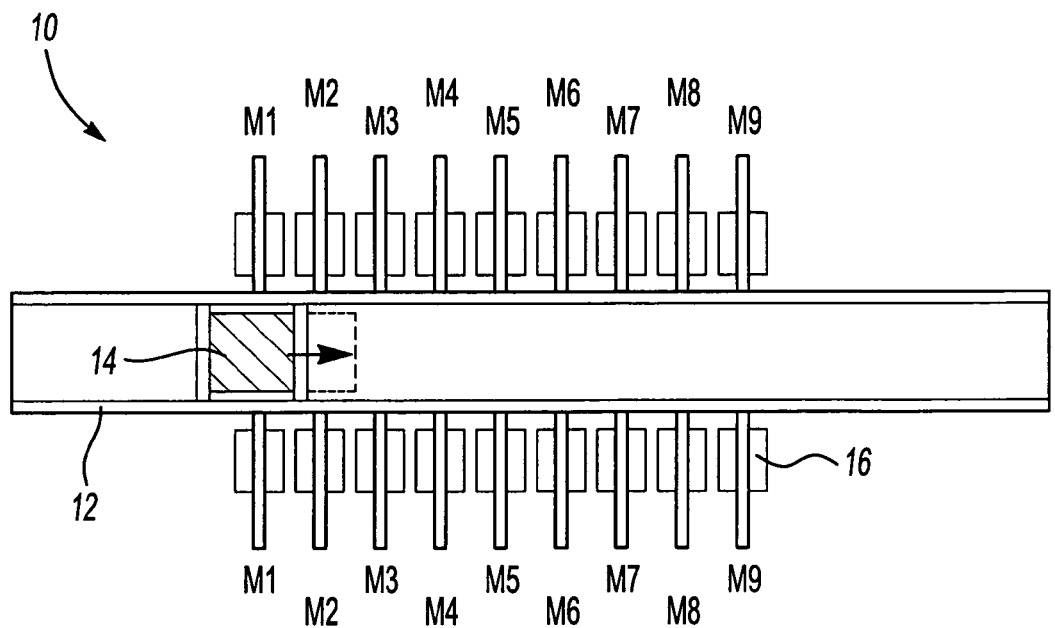
FIG. 1 is a cross-sectional view of an example tubular switched reluctance linear motor.

FIG. 1 illustrates a simplified cross-sectional schematic view of a tubular switched reluctance linear motor 10. The linear motor 10 includes a tubular rotor guide 12 in which a rotor 14 moves in response to magnetic fields generated by coil magnets 16. The coil magnets 16 are numbered M1-M9 and each coil magnet 16 includes two coils, a north and a south pole, in series. In the illustrated position, the rotor 14 is located adjacent the coil magnet M1. When the M2 coil magnet 16 is selectively energized, a magnetic field is produced. The magnetic field attracts a magnetic material in the rotor 14, which causes the rotor 14 to move from the position illustrated in FIG. 1 into alignment with the M2 coil magnet 16. In the process of moving, the rotor 14 moves a fluid contained inside the tubular motor guide 12.

Figure 2:
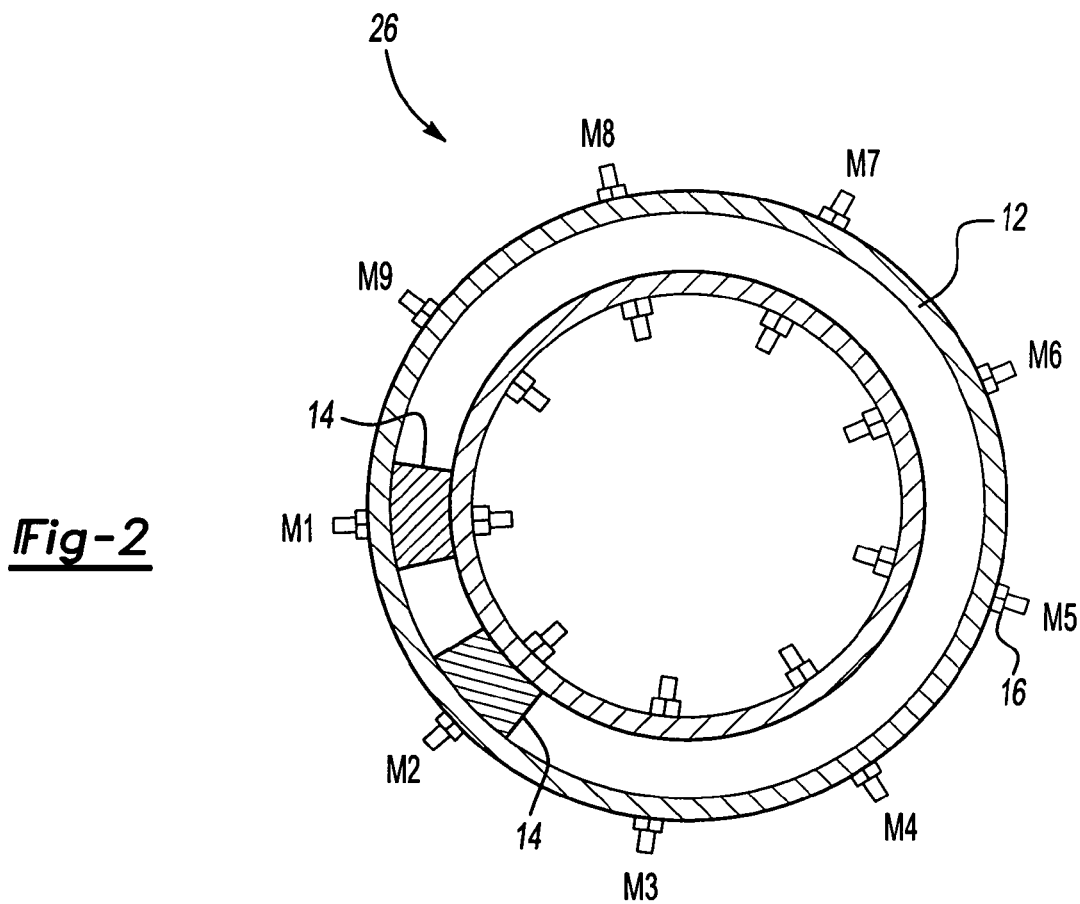
FIG. 2 is a cross-sectional view of an example tubular switched reluctance torus motor.

FIG. 2 illustrates a simplified cross-sectional schematic view of a tubular switched reluctance torus motor 26. The torus motor 26 forms a circular shape, however, an elliptical or other shape may also be used. For further understanding of the torus motor 26, attention is directed to U.S. patent application Ser. No. 11/043343, entitled "TORUS GEOMERTY MOTOR SYSTEM," which is assigned to the assignee of the instant invention and which is incorporated herein in its entirety.

The torus motor 26 includes a tubular rotor guide 12 in which the rotors 14 move in response to magnetic fields generated by the coil magnets 16. The coil magnets 16 are selectively energized to move the rotors 14 through the tubular motor guide 12 to move a fluid contained inside the tubular motor guide 12.

Figure 3:
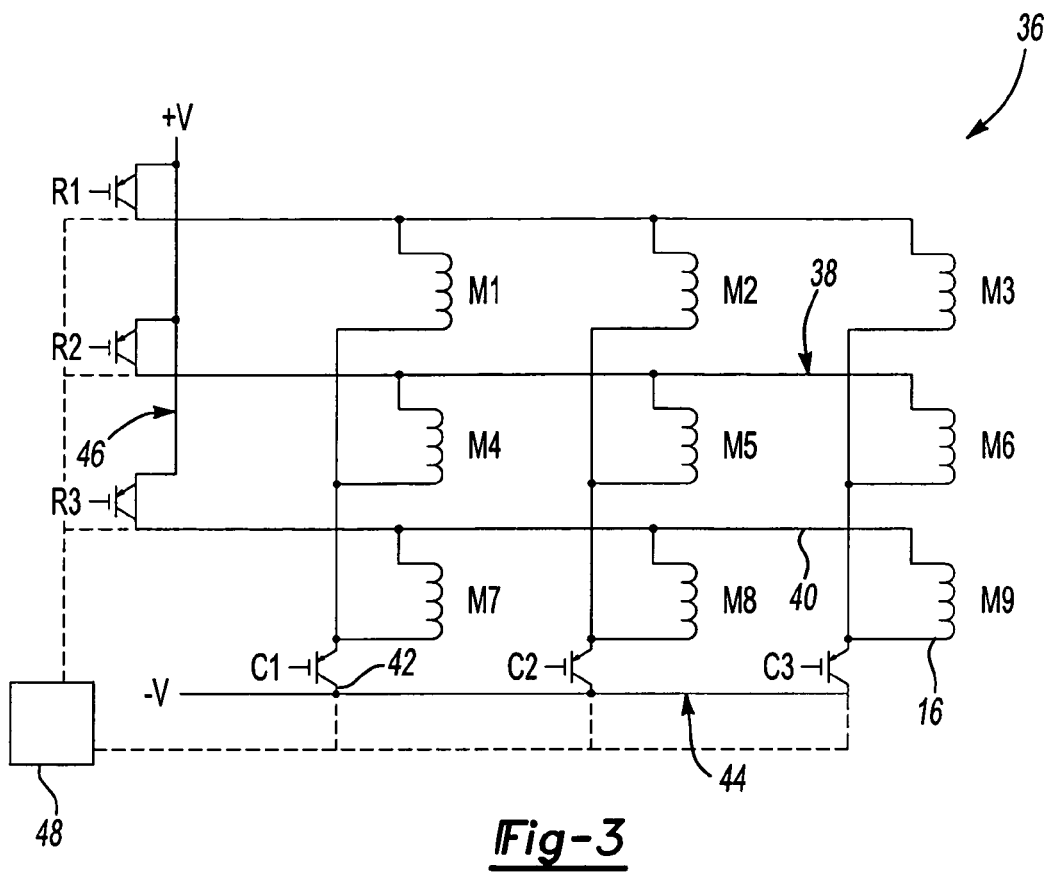
FIG. 3 is a schematic view of an example motor drive configuration.

FIG. 3 illustrates a simplified schematic view of a motor drive circuit configuration 36 used to drive the linear motor 10, the torus motor 26, or other electric multi-phase motors. The motor drive circuit configuration 36 includes an electrical matrix 38 of coil magnets 16. The coil magnets 16 are interconnected with electrical connections 40 in coil magnet rows and columns. In the example shown, the M1, M2, and M3 coil magnets 16 form one row and the M1, M4, and M7 coil magnets 16 form one column.

A plurality of transistors 42 are electrically connected to the coil magnets as a row 44 of transistors 42 and a column 46 of transistors 42. Each transistor 42 in the row 44 corresponds to a column of coil magnets 16. The C2 transistor 42 corresponds to the M2, M5, and M8 coil magnet 16 column. Each transistor 42 in the column 46 of transistors 42 corresponds to a row of coil magnets 16. A controller 48 controls the operation of the transistors 42 and selectively energizes the coil magnets 16.

In one example, it is desired to energize the M5 coil magnet 16. The controller 48 selectively turns on the C2 transistor 42 and the R2 transistor 42 to complete the electrical connection between a positive and negative DC voltage. Although the circuit includes nine coil magnets 16 and six transistors 42, other circuit configurations are also possible such as, but not limited to, twelve coil magnets 16 with seven transistors 42, eighteen coil magnets 16 with nine transistors 42, sixteen coil magnets 16 with eight transistors 42, thirty-six coil magnets 16 with twelve transistors 42, and eighty-one coil magnets 16 with eighteen transistors 42. Unlike previously known motor drive circuits, the motor drive circuit configuration 36 provides control over the coil magnets 16 with a lesser number of transistor 42 pairs.

Figure 4:
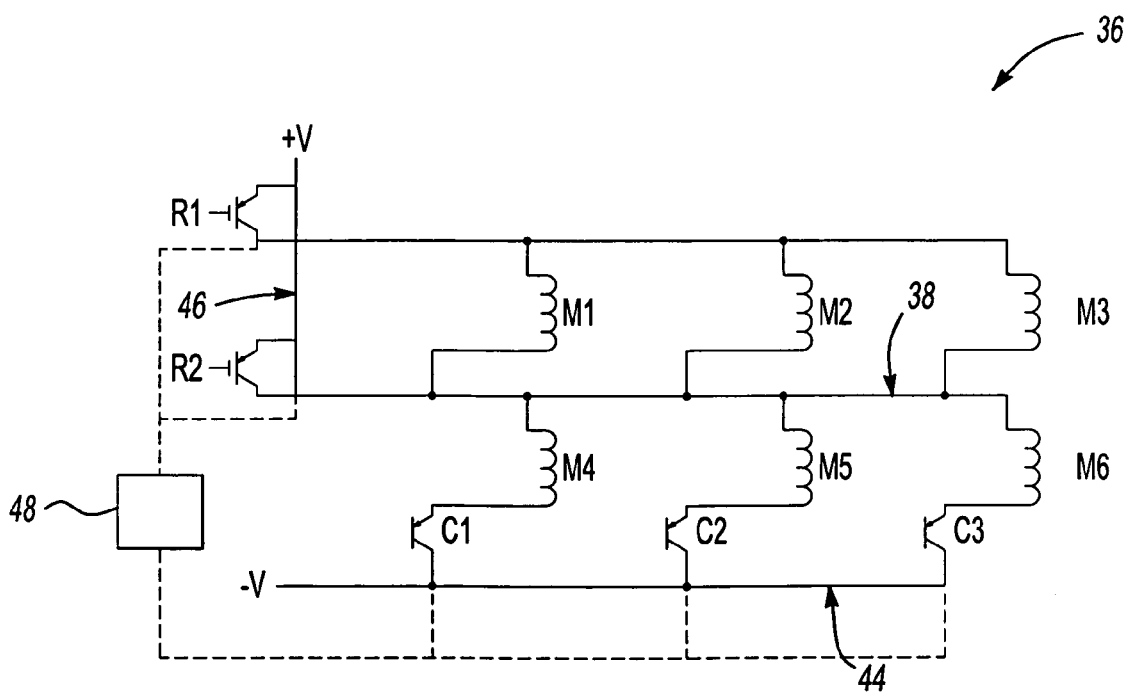
FIG. 4 is a schematic view of another embodiment of a motor drive.

FIG. 4 illustrates a simplified schematic view of another motor drive circuit configuration 36 that includes an electrical matrix 38 having two rows and three columns of coil magnets 16. Unlike the circuit illustrated in FIG. 3, this circuit does not include the same number of coil magnets 16 in each row as are in each column. This may provide the benefit of controlling simultaneous operation or overlapping operation of two or more of the coil magnets 16, as will be discussed below.

In the motor drive circuit configuration 36, the number of transistors 42 is related to the number of coil magnets 16 according to the equation $S=2(N^{1/2})$, wherein S equals the number of transistors and N equals the number of coil magnets 16. Motor drive circuit configurations 36 according to the equation may be arranged in a symmetric electrical matrix 38 as shown in the example in FIG. 3 or in an asymmetrical electrical matrix 38 as shown in the example in FIG. 4.

The motor drive circuit configuration 36 provides the benefit of a lower average electrical current compared to previously known motor drive circuits. In one example, a known motor drive includes three coil magnets with six transistors that operate at a peak electrical current of sixty amps. The average electrical current per transistor is twenty amps. An example electrical matrix 38 having thirty-six coil magnets 16 with twelve transistors 42 also operates at a peak electrical current of sixty amps. The average electrical current per transistor 42 is ten amps. The lower average electrical current for the example electrical matrix 38 permits smaller and less expensive transistors 42 to be utilized.

In another motor drive circuit configuration 36 example, the controller 48 pulses the on/off duty cycle of the coil magnets 16 to control the speed of the rotor 14. The controller 48 pulses a selected coil magnet 16 at a selected frequency over a cycle period. When the selected coil magnet 16 is energized, the magnetic field attracts the rotor 14 and when the selected coil magnet 16 is off, there is no magnetic field to attract the rotor 14. By pulsing the magnetic field, the attraction on the rotor 14 may be controlled to control the speed and force of the rotor 14.

The force that the rotor 14 exerts on the fluid in the tubular rotor guide 12 (FIG. 2) increases as the length of magnetic field pulses increases. That is, longer "on" pulses create greater attraction and more force. This feature of controlling the rotor 14 provides the benefit of increased operational efficiency compared to previously known multi-phase motors and motor drives.

In one operational example, the selected frequency of pulses is 3.906 kilohertz and the cycle period is 256 microseconds. The controller 48 pulses the selected coil magnet 16 "on" for 64 microseconds and "off" for the remaining 192 microseconds of the 256 microsecond cycle period. Should a greater rotor speed or force be required, the controller 48 pulses the selected coil magnet 16 for 50%, 60% or 75% of the 256 microsecond cycle period, for example. For a firing pulse of 1,024 microseconds, the controller 48 repeats the cycle period of 256 microseconds four times.

In another motor drive circuit configuration 36 operational example, the controller 48 varies the length of time of the pulses to control the magnetic field attraction on the rotor 14. As is known, the magnetic field attraction on the rotor 14 is inversely proportional to the distance between the rotor 14 and the coil magnet 16 that generates the magnetic field. That is, the closer the rotor 14 is to the coil magnet 16, the higher the magnetic field attraction. Therefore, the force increases dramatically as the rotor 14 approaches the coil magnet 16 and the speed of the rotor 14 increases. The controller 48 controls this force for smoother movement of the rotor 14 by delivering more magnetic field force when the rotor is farther away from the coil magnetic 16. This feature of controlling the rotor 14 provides the benefit of increased operational efficiency compared to previously known multi-phase motors and motor drives.

In another operational example, the controller 48 pulses the on/off duty cycle of a selected coil magnet 16. The length of the "on" duty cycle is proportional to the distance between the rotor 14 and the selected coil magnet 16. That is, when the rotor 14 is farthest away from the selected coil magnet 16, the "on" duty cycle is longer to generate a greater amount of magnetic field attraction on the rotor 14. When the rotor 14 is closer to the selected coil magnet 16, the "on" duty cycle is shorter to produce a lesser magnetic field attraction on the rotor 14. This provides the benefit of smooth movement of the rotor between selected coil magnets 16 compared to previously known multi-phase motor and motor drives.

In another motor drive configuration 36 example, the controller 48 energizes a plurality of coil magnets 16 simultaneously. The controller 48 turns on a selected transistor 42 in row 44 of transistors 42 and at least two selected transistors 42 in the column 46 of transistors 42. This has the effect of energizing the coil magnets 16 that correspond to the three selectively turned on transistors 42.

In another operational example, the controller 48 turns on the C2 transistor 42 and the R1 transistor 42 and the R2 transistor 42 to energize the M2 and M5 coil magnets 16 (referring to FIG. 3). This feature may provide the advantage of moving multiple rotors 14 simultaneously or in overlapping time frames. In another example, the C2 transistor 42 handles a larger capacity of electric current than the other transistors 42 in order to handle the additional electric current needed to energize both the M2 and M5 coil magnets 16.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A multi-phase motor drive, comprising:

a plurality of coil magnets that generate a magnetic field when energized with an electric current;

a plurality of switches in electrical communication with said plurality of coil magnets and arranged in an electrical matrix with said plurality of coil magnets, the electrical matrix including electrical circuit columns and electrical circuit rows, said plurality of switches including a row of switches and a column of switches, and each switch of said row of switches is in electrical communication with one of said electrical circuit columns and each switch of said column of switches is in electrical communication with one of said electrical circuit rows, each coil magnet is in electrical communication with at least two switches, and each switch is in electrical communication with more than one coil magnet, wherein said electrical matrix comprises eight coil magnets and six switches.

2. A multi-phase motor drive comprising:

a plurality of coil magnets that generate a magnetic field when energized with an electric current; and a plurality of switches in electrical communication with said plurality of coil magnets and arranged in an electrical matrix with said plurality of coil magnets, the electrical matrix including electrical circuit columns and electrical circuit rows, said plurality of switches including a row of switches and a column of switches, and each switch of said row of switches is in electrical communication with one of said electrical circuit columns and each switch of said column of switches is in electrical communication with one of said electrical circuit rows, each coil magnet is in electrical communication with at least two switches, and each switch is in electrical communication with more than one coil magnet, wherein a number of coil magnets, N, and a number of switches, S, are related by the equation $S=2(N^{1/2})$.

* * * * *